(12) United States Patent
Sugata et al.

(10) Patent No.: US 6,394,940 B1
(45) Date of Patent: May 28, 2002

(54) CHIP SUCTION TYPE MACHINE TOOL

(75) Inventors: Shinsuke Sugata; Yoshinori Seo, both of Fukuyama (JP)

(73) Assignee: Horkos Corp., Hiroshima-ken (JP)

( * ) Notice: Subject to any disclaimer, the term of this patent is extended or adjusted under 35 U.S.C. 154(b) by 0 days.

(21) Appl. No.: 09/889,785

(22) PCT Filed: Feb. 9, 2000

(86) PCT No.: PCT/JP00/00732
§ 371 (c)(1),
(2), (4) Date: Jul. 20, 2001

(87) PCT Pub. No.: WO00/50199
PCT Pub. Date: Aug. 31, 2000

(30) Foreign Application Priority Data

Feb. 22, 1999 (JP) ............................................. 11-042876

(51) Int. Cl.[7] .............................. B23Q 3/157; B23C 9/00
(52) U.S. Cl. ............................. 483/13; 408/61; 409/134; 409/137; 451/456
(58) Field of Search ................................ 409/137, 134, 409/230; 483/13; 408/67, 241.6, 61; 451/456; 29/DIG. 86, DIG. 94, DIG. 78

(56) References Cited

U.S. PATENT DOCUMENTS

| | | | | |
|---|---|---|---|---|
| 3,828,649 A | * | 8/1974 | LeCailtel et al. | ............ 409/137 |
| 4,957,148 A | * | 9/1990 | Shoda | .................... 409/134 X |
| 4,981,403 A | * | 1/1991 | Katayama | .................... 409/136 |
| 5,791,842 A | * | 8/1998 | Sugata | ...................... 408/61 X |
| 5,947,661 A | * | 9/1999 | Sugata | ....................... 409/137 |
| 5,984,598 A | * | 11/1999 | Arai et al. | .................... 409/137 |
| 6,264,590 B1 | * | 7/2001 | Ferrari | ........................ 483/13 |

FOREIGN PATENT DOCUMENTS

| | | | | |
|---|---|---|---|---|
| JP | 36-34245 | * | 2/1985 | .................. 409/137 |
| JP | 63-16910 | * | 1/1988 | .................. 483/13 |
| JP | 2-114408 | * | 9/1990 | .................. 408/61 |
| JP | 8071884 | * | 3/1996 | .................. 409/137 |
| WO | WO 9519869 | * | 7/1991 | .................. 409/137 |

* cited by examiner

*Primary Examiner*—William Briggs
(74) *Attorney, Agent, or Firm*—Venable; John P. Shannon

(57) ABSTRACT

A chip suction type machine tool continuously removing chips produced during work machining by air suction, comprising a tool attaching part (200) in which a vent hole (s1) is formed and a spindle head (100) having an air suction hole (s2) communicating with the vent hole (s1) wherein, with the tool attaching part (200) installed on the spindle head (100), a telescoping cylinder means (201) which is formed in an inclined surfaces crossing at an angle (θ) of approximately 60° or below, and facing closely, the direction of the spindle, allows at least one of the downstream end part of the vent hole and the upstream end part of the air suction hole to be deformably telescoped and, in free state, is held in a retracted state so that these downstream and upstream end parts are departed from each other by elastic member (205) which is provided between the downstream end part of the vent hole (s1) and the upstream end part of the air suction hole (s2).

7 Claims, 4 Drawing Sheets

CHIP SUCTION TYPE MACHINE TOOL

FIELD OF THE INVENTION

The present invention relates to a machine tool that continuously removes chips by means of air suction during processing a work.

BACKGROUND OF THE INVENTION

FIG. 4 shows a machine tool of Japanese Patent No. 2827003 by this inventors. As shown in this figure, there has been a chip suction machine tool having a tool attaching part 200 and a spindle head 100. The tool attaching part 200 includes a vent hole s1 for discharging chips and air through a hood means 13 surrounding a cutting tool 11. The spindle head 100, on which the tool attaching part 200 is mounted, has an air suction hole s2 that communicates with the vent hole s1.

This kind of machine tool employs simple structures for installing and removing the tool attaching part 200. For example, a downstream end part of the vent hole s1 and an upstream end part of the air suction hole s2 are connected with each other beside a tip end of a spindle 3. In addition, the downstream end part is firmly pressed and connected to the upstream end part on a face fa0 which is perpendicular to the spindle 3.

Though the above machine tool is very useful, the present invention further improve the following problems.

In a conventional machine tool, it is hard to install the tool attaching part 200 on the spindle head 100 or remove it therefrom smoothly and correctly owing to contact pressure working between the downstream end part of the vent hole s1 and the upstream end part of the air suction hole s2.

Besides, when the tool attaching part 200 is installed on the spindle head 100, chips occasionally enter between the downstream end part of the vent hole s1 and the upstream end part of the air suction hole s2. Unless the chips are carefully removed, it is feared that their complete coupling is spoiled by the chips.

Moreover, in order to achieve a firm connection between the downstream end part of the vent hole s1 and the upstream end part of the air suction hole s2, these end parts must be very accurately processed so that their relative positions may meet with each other at a specified position, respectively. This process takes a great deal of time.

Furthermore, the hood means 13 protrudes toward a perpendicular direction to the spindle 3 owing to an existence of the vent hole s1, thereby enlarging and unbalancing the whole body. Besides, its handling is inconvenient.

In addition, especially when using the spindle 3 horizontally, a protruding direction of the tool attaching part 200 becomes incorrect owing to weight of the tool attaching part 200 as well as contact pressure between the downstream end part of the vent hole s1 and the upstream end part of the air suction hole s2, therefore it is feared of having a bad influence on accuracy.

SUMMARY OF THE INVENTION

A chip suction type machine tool of this invention comprises a tool attaching part having a vent hole for discharging chips and air through the inside of a hood means that surrounds a cutting tool, and a spindle head having an air suction hole that communicates with the air vent hole. The tool attaching part is installed on the spindle head. The downstream end part of the vent hole is closely faced to the upstream end part of the air suction hole with the tool attaching part installed on the spindle head. A telescoping cylinder means is provided between the downstream and upstream end parts, being extendable or retractable at least one of the end parts. While the telescoping cylinder means is free, it is kept in shrinking by means of an elastic member so as to separate the downstream end part from the upstream end part. When negative pressure is given to the air suction hole with the tool attaching part installed on the spindle, the telescoping cylinder means is extended on the negative pressure, and functions so as to closely connect the downstream end part with the upstream end part.

Here, the telescoping cylinder means, for example as shown in claim 4, comprises a retractable multiple cylinder structural member and an elastic member for shrinking them.

In this invention, when the tool attaching part is installed on or removed from the spindle head, the telescoping cylinder means can keep the downstream end part of the vent hole off the upstream end part of the air suction hole. Therefore, there arises no unbalanced force due to their contact, thereby effecting a smooth and exact treatment.

Besides, when the negative pressure is given to the air suction hole after the tool attaching part is installed on the spindle head, the air is sucked into the air suction hole not only from the inside of the hood means but also from a space between the downstream end part of the vent hole and the upstream end part of the air suction hole. Accordingly, even through chips adhere to the space, they are sucked and carried away with the air without being caught between the downstream end part and the upstream end part.

Moreover, while the tool attaching part being installed on the spindle head, the downstream end part of the vent hole is connected with the upstream end part of the air suction hole by an extension work of the telescoping cylinder means. Therefore, even if relatively large error due to manufactural accuracy happens to a relative position of the downstream end part, it cause no trouble in its function.

Furthermore, the downstream end part of the vent hole is closely faced to the upstream end part of the air suction hole so that they may cross to the spindle at a suitable angle θ. Therefore, the size of protrusion of the tool attaching part can be downsized.

The above invention can be materialized as the following.

As shown in claim 2, the hood means comprises a hood body surrounding the cutting tool and a cylinder having an opening for receiving a cutting tool on its front end face. The cylinder is retractable in a direction of the cutting tool, and pushed forward in the direction of the cutting tool by means of an elastic member. While the cutting tool is processing the work, the front end face of the cylinder is in contact with a work. Chips produced by the cutting tool join up with air flowing into the cylinder to be discharged outside through the hood body, the vent hole, and the air suction hole.

As shown in claim 3, the hood means comprises a hood body surrounding the cutting tool and a cylinder whose front end face is in a U-letter shape from a cross section view, having a comparatively small opening for receiving the cutting tool at the center. The cylinder is retractable in a direction of the cutting tool, and pushed forward in the direction of the cutting tool by means of an elastic member. Besides, while the cutting tool is processing the work, the front end face of the cylinder is close to but not in contact with a work by air flow caused by the negative pressure of the air suction hole. Chips produced by the cutting tool join up with air flowing into the cylinder and discharged outside through the hood body, the vent hole, and the air suction hole.

As shown in claim 5, the upstream end part of the air suction hole of the spindle head is close connected to the downstream end part of the vent hole of the tool attaching part beside the hood means. Therefore, in spite of the existence of the vent hole, the hood means do not protrude toward the perpendicular direction to the spindle, thereby miniaturizing and balancing the whole body. Besides, when the tool attaching part is used sideways, it does not bend largely due to self weight.

As shown in claim 6, a contact surface of the upstream end part of tile air suction hole of the spindle head and the downstream end part of the vent hole of the tool attaching part is inclined along the direction of the spindle. Here, the contact surface is apart from a rotatory center of the spindle as it goes forward to the spindle. Therefore, miniaturizing the tool attaching part is helped. Besides, when the tool attaching part is installed on or removed from the spindle, the inclination of the contact surface prevents the downstream end part of the vent hole from being caught in the upstream end part of the air suction hole.

PREFERRED EMBODIMENT OF THE PRESENT INVENTION

The first embodiment of this invention will be described with reference to FIGS. 1 and 2.

Figure 1:
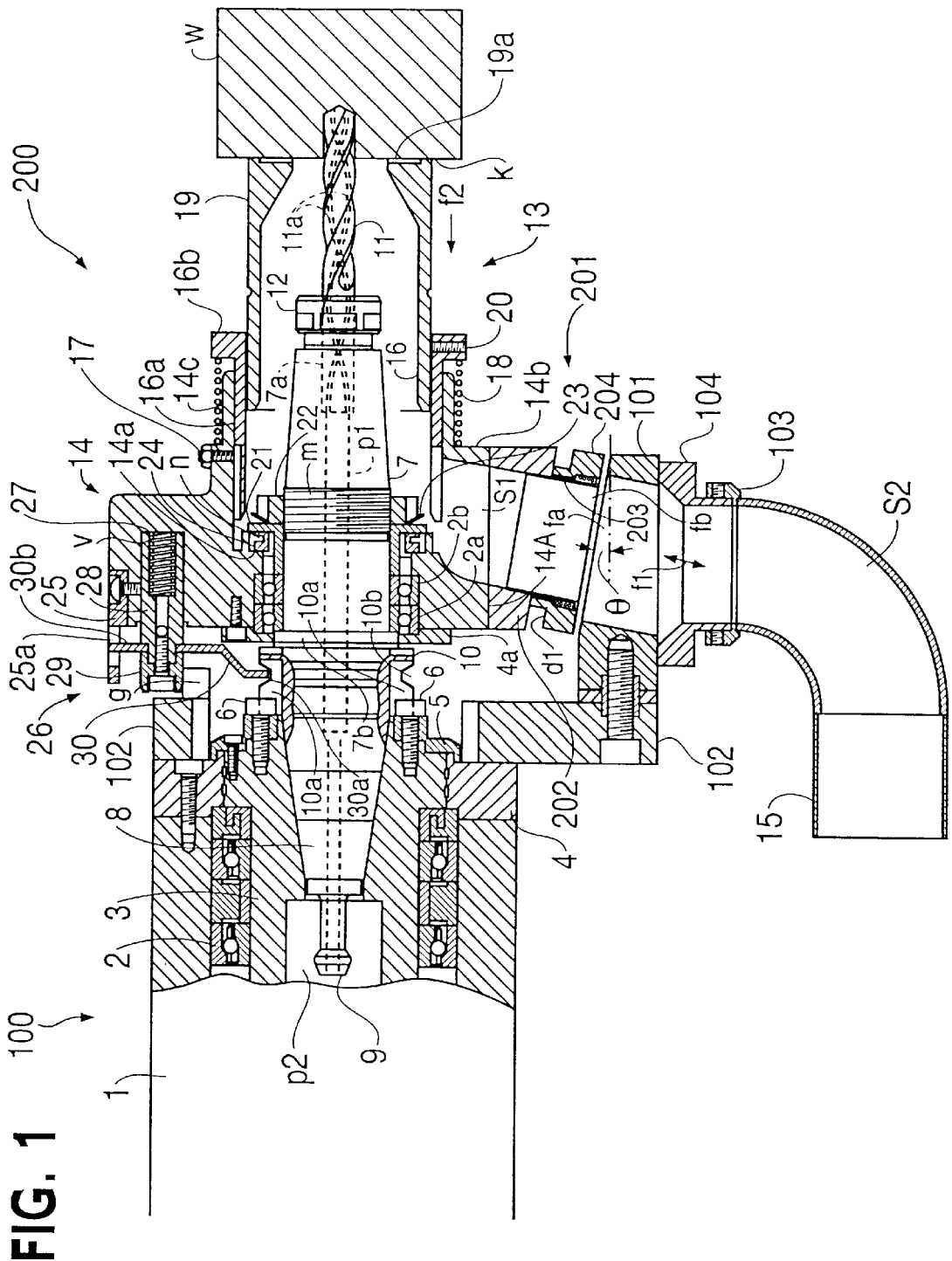
FIG. 1 is a sectional view of a processing head of a chip suction type machine tool according to the first embodiment of this invention.
Figure 2:
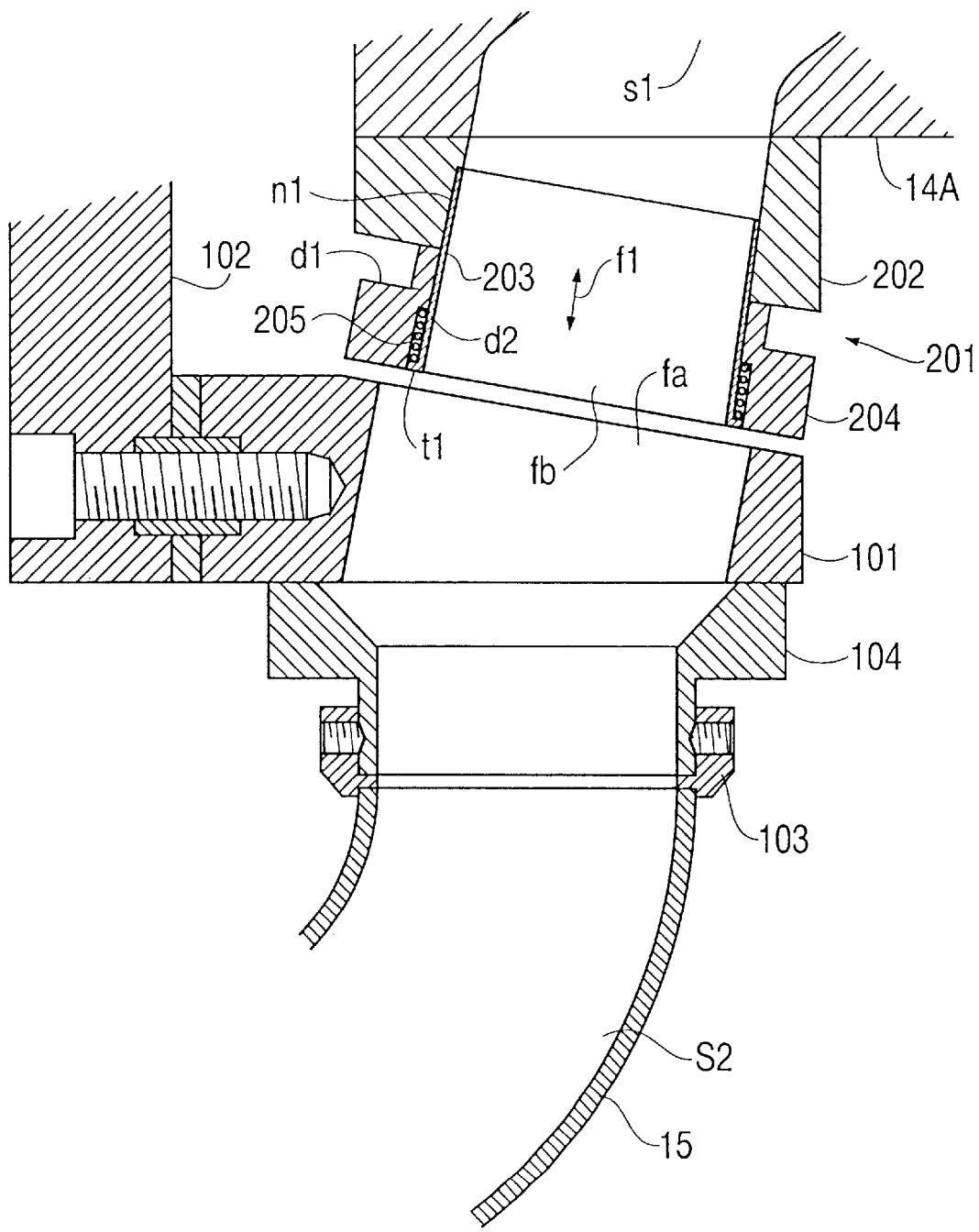
FIG. 2 is a partly enlarged view of the above embodiment.

FIG. 1 shows a processing head of a machine tool (a machining center) having an automatic tool changing structure and a hood whose tip end is in contact with a work. FIG. 2 shows a partly enlarged view of the machining center.

In these drawings, 1 is a spindle supporting member that forms a spindle head 100. The spindle 1 has an inner hollow in which a spindle 3 is rotatably provided by means of ball bearings 2 at a fixed position.

The numeral 4 is a check ring bolted to the top face of the spindle supporting member 1, 5 is a cover ring engaged with and bolted to the tip end of the spindle 3 of small diameter. Numerals 6, 6 are two keys for regulating rotations of a holder 7 fixed to the spindle 3. Each key 6 is protrudently fixed to the end surface of the spindle 3 by means of a bolt.

The numeral 200 is a tool attaching part having the holder 7 and a hood means 13 integrated therewith.

The holder 7 is provided with a taper shank 8 on its base side. The shank 8 is inserted in a hole formed at the center of the spindle 3. A pull stud 9 is provided at the rear end of the shank 8. While the holder 7 is fixed, tile pull stud 9 is engaged with a not-illustrated draw bar, and pulled behind. When taking out the holder 7, the pull stud 9 is pushed toward the tip end of the spindle 3 by the draw bar, so that it is released from the engagement with the draw bar.

Around the center of the holder 7 is provided a protuberant rim 10 that comprises concaves 10a, 10a and a circular concave 10b on its circumference. The concaves 10a, engage with the two keys at two parts on a side end face of the spindle 3.

The tip end of the holder 7 is protrudent, having a central hole 7a for receiving a cutting tool 11 such as a drill, tap, or reamer. A grip 12 is provided to hold the base of the cutting tool 11 inserted into the hole 7a.

The hood means 13 is made of rigid material, forming an air-tight space around the cutting tool 11 such as a drill. A specific explanation follows.

A cylindrical metallic hood body (an outer cylinder) 14 is formed to encircle the holder 7. On the inner side of the outer cylinder 14 is provided a partition 14a of a shorter diameter. A step difference 14b is found at the tip end of an outer periphery of the outer cylinder 14 so that a small diameter part 14c is provided. One part 14A of the cylinder 14 slightly protrudes in a direction perpendicular to tile longitudinal holder 7. This protruding part 14A has a vent hole s1 that communicates with an inner space of the later described inner cylinder 16 and the air.

At the downstream end part of the vent hole s1 is provided a telescoping cylinder means 201 for displacing the downstream end part to a specific direction f1. As shown in FIG. 2, the telescoping cylinder means 201 comprises a mouthpiece 202 fixed to the part 14A so as to communicate with the vent hole s1, a guide cylinder 203 screwed oil a hole of the mouthpiece 202, a sliding cylinder 204 slidably provided outside the guide cylinder 203, and an elastic member 205 for pressing the sliding cylinder 204 toward the tip of the guide cylinder 203.

Here, the mouthpiece 202 has an internal thread at a part of its inside. The guide cylinder 203 is made straight, having an external thread n1 screwed on the internal thread at its base end and a protuberant rim t1 at its tip end.

The sliding cylinder 204 has a step face d1 on its outer surface and a step face d2 on its inner surface, thereby forming holes of a large diameter and a small diameter. Here, the hole of a small diameter is air tightly and slidably provided to the outside of the guide cylinder 203 by means of a seal or nothing. The hole of a large diameter forms a circumferential space between the guide cylinder 203, into which the elastic member 205 is compressingly inserted. One end of the elastic member 205 is supported by the rim t1 of the guide cylinder 203, while the other end is supported by the step face d2 of the sliding cylinder 204. Thus, the elastic member 205 pushes the sliding cylinder 204 toward the holder 7, and keeps the telescoping cylinder means 201 in a shortened state, when the sliding cylinder 204 is free.

A duct 15 is fixed to the outer side of the spindle 3. The inside thereof forms an air suction hole s2. At the upstream end part of the air suction hole s2 is provided a sheet 101 having a hole formed just beside the hood body 14. The sheeting member 101 is bolted to a protrudent supporting member 102 fixed by the check ring 4. When the holder 7 is mounted to the spindle 3, the sheet 101 closely faces the sliding cylinder 204 at the downstream end part of the vent hole s1. In this case, a front face fa of the sheet 101 and a front face fb of the sliding cylinder 204 incline at a suitable angle θ for the spindle. The angle θ is preferably within the range of 10°~40°. These front faces fa and fb go away from a rotation center of the spindle 3 as they go to the front of the spindle 3. The hole of the sheet 101 is connected with the duct 15 by means of joiners 103 and 104.

Besides, a metallic inner cylinder 16 is slidably and air tightly inserted into the small diameter part 14c. A thin groove 16a is provided on the outer circumference of the inner cylinder 16 along its axial direction. A guiding screw 17 is fixed to the circumference of the small diameter part 14c. The tip of the guiding screw 17 engages in the thin groove 16a so as to regulate circumferential rotations of the inner cylinder 16. Thus, the inner cylinder 16 is adjustably inserted in the hood body 14 within the length of the thin groove 16a.

A flange 16b is provided to the tip of the inner cylinder 16. A compressed spring 18 is provided on the small diameter part 14c between the flange 16b and the above-described difference 14b so as to push out the inner cylinder 16 toward its tip end with the spring force.

In this case, it is preferable that a metallic cylinder 19 for adjusting the protruding length may be slidably inserted into the inner cylinder 16. It is also preferable that a fixing screw 20 may be screwed to the circumference of the inner cylinder 16, so that f2 directional positions of the cylinder 19 can be arranged by handling the fixing screw 20. If necessary, a notch k may be provided on a front end face 19a of the cylinder 19 at suitable intervals in its circumferential direction, so that the inside of the cylinder 19 can communicate with the atmosphere. A through hole provided on the tip of the cylinder 19 may substitute for the notch k.

A disk 21 is externally mounted on the circumference of the holder 7. One end of the disk 21 is engaged with later-described ball bearings 2a, 2b and a protruding bar 7b, while the other end is screwed and fixed by a nut 22 that is engaged with a thread portion m formed on the outer circumference of the holder 7. The numeral 23 is a washer provided between the disk 21 and the nut 22. On the front face of the partition 14a is provided a circular groove n into which a seal packing 24 is fit. The seal packing 24 is in touch with a radius directional face of the disk 21 so as to keep an air-tight space under rotations of the holder 7.

Many kinds of attaching parts 200 are stored in a not-illustrated magazine. A not-illustrated tool exchanging arm of an automatic tool exchanging device holds the circular groove 10b of the holder 7 so as to exchange the tool attaching part 200 suitably. An engaging means 26 for fixing and removing the tool attaching part 200 is shown in the figure. Here, a through hole v is provided to a protrusion that is right opposite to a part 14A of the outer cylinder 14. A bar 28 is inserted into the through hole v by means of a compressed spring 27. An engaging member 30 is bolted to the bar 28 by means of a cap 29. The tip 30a of the engaging member 30 engages with a not-illustrated groove provided on the protuberant rim 10 in an axial direction of the holder, while the base end 30b of the engaging member 30 engages with a spindle directional groove 25a provided on a guiding fragment 25 fixed to the outer cylinder 14, so that the engaging member 30 can suitably slide when fixing or removing the tool attaching part 200.

Besides, the holder 7 is mounted on the outer cylinder 14 by means of the ball bearings 2a and 2b, so that it can turn at a fixed position. One end of the ball bearing 2a is engaged with the protruding bar 7b of the holder 7, while the other ball bearing 2b is engaged with the end face of the disk 21. The numeral 4a is a stop ring bolted to the outer cylinder 14. Moreover, an engaging groove g is provided at a fixed position of the protrudent supporting member 102 in a radius direction of the spindle 3, into which the cap 29 of the engaging means 26 is inserted. The numeral p1 is a central hole provided in the holder 7. An opening of the center hole p1 on the spindle 3 is open to the atmosphere, or a compressed air is supplied into the opening from the outside. The numeral 11a is a vent hole provided in the cutting tool 11.

Here, the holder 7, the hood means 13, the cutting tool 11, the telescoping cylinder means 201 and the engaging means 26, each being independent, are integrally constructed as the tool attaching part 200. The tool attaching part 200 is received inside the magazine as a single substance. According to necessity, the tool exchanging arm of the automatic tool exchanging device holds the circular groove 10b of the holder 7 so as to move the tool attaching part 200 suitably. While the tool attaching part 200 is fixed to the spindle 3, a rotating direction of the holder 7 is regulated to a certain degree, since the holder 7 engages with the tip 30a of the engaging member 30 and a fixed position of the protuberant rim 10. Accordingly, the concaves 10a, 10a of the holder 7 accurately face to the keys 6, 6 that stay at a fixed position in a rotating direction of the spindle 3 due to its orientation function. When the cap 29 is engaged with the engaging groove g, the tool exchanging arm functions to push the tool attaching part 200 to the left side of FIG. 1. Therefore, the tip 30a of the engaging member 30 is displaced together with the cap 29 relative to a fixed position of the protuberant rim 10 to release rotating regulations of the holder 7. Then, the holder 7 now becomes rotatable. At the same time, the holder 7 is fixed to the spindle 3 in connection with a not-illustrated draw bar. Here, an engagement of the cap 29 with the engaging groove g regulates rotations of the hood means 13 around the spindle 3. Since the sliding cylinder 204 is only a little apart from the front face fa of the sheeting member 101 as shown in FIG. 1, the tool attaching part 200 can be installed smoothly and exactly.

An explanation follows about a working example and its operation regarding thus constructed invention. A work w is fixed on a not-illustrated working table, and a forward protruding dimension of the cylinder 19 is suitably adjusted by operating the fixing screw 20. Thereafter, the machine tool is put into operation to displace the spindle head 100, thereby displacing the spindle 3 close to the work w. Meanwhile, an air suction device continuously sucks air inside the hood means 13 through the air suction hole s2, making the insides of the air suction hole s2 and the vent hole s1 negative pressure. Accordingly, the air is powerfully sucked from an opening between the front face fb of the sliding cylinder 204 and the front face fa of the sheeting member 101, thereby sucking and removing extraneous materials such as chips, which adhere to the front faces fa and fb, with the atmosphere. When the negative pressure inside the air suction hole s2 and the vent hole s1 exceeds constant level, a balance changes among a pressure affecting the front face fb of the sliding cylinder 204, atomoshperic pressure affecting the stepped face d1 thereof, and elasticity of the elastic member 205. Accordingly, the sliding cylinder 204 moves against the elasticity of the elastic member 205, and the front face fb is closely pressed on the front face fa of the sheeting member 101. Thereafter, the air inside the hood means 13 is continuously sucked through the air suction hole s2 and the vent hole s1.

When the spindle 3 moves forward, the open end face 19a of the cylinder 19 touches the work w so as to form a closed space surrounded with the hooding body 14, the inner cylinder 16, the cylinder 19, and the disk 21. Then, in accordance with the forward movements of the spindle 3, the inner cylinder 16 and the cylinder 19 are pushed together into the outer cylinder 14 against the elongating force of the elastic member 18. Under this condition, the air is compulsorily poured into the hood means 13 through a space room p2, the central hole p1 and a vent hole 11a, and then discharged through the air suction hole s2.

When the spindle 3 moves further, the tip of the cutting tool 11 touches the surface of the work w, and then cutting starts. At this time, chips are produced. Since the air is intensively poured from the tip of the cutting tool 11 and sucked into the air suction hole s2, the chips are removed and carried out to a specified place with the air flow.

Afterwards, even when the cutting tool 11 bores the work deeply, the air is still poured from the tip of the cutting tool continuously. Accordingly, the flow of the chips is not prevented, and the chips are immediately and smoothly removed from a cut place of the cutting tool 11 to the outside of the work w.

Depending on constructions of the machine tool or processing conditions of the work, it may be insufficient to pour the air only from the tip of the cutting tool 11 into the closed space of the hood means 13. In such a case, the air is poured from the notch k into the closed space of the hood means 13 for supplement.

Being in touch with the work, the hood means 13 may be dragged in a direction perpendicular to the spindle 3. In addition, wall surfaces thereof may be intensively struck by keen chips. However, the outer cylinder 14, the inner cylinder 16, and cylinder 19, all made of rigid material such as metal, call sufficiently resist it.

When the processing is over, the spindle 3 stops at the mounted position again due to an orientative function thereof, and suction of the air from the air suction hole s2 stops suitably. Because of this stop, the negative pressure of the air suction hole s2 and the vent hole s1 disappears, which leads to change the balance among the pressure upon the front face fb of the sliding cylinder 204, the atomospheric pressure upon its stepped face d1, and the elasticity of the elastic member 205. Thus, the sliding cylinder 204 returns to its original position with the elasticity of the elastic member 205, and then the front face fb leaves from the front face fa of the sheeting member 101. Then, the tool exchanging arm removes the tool attaching part 200 from the spindle 3 in reverse order to its installing, and stores it inside the magazine. Here, since the sheeting member 101 is apart from the sliding cylinder 204, the tool attaching part 200 can be removed smoothly and exactly. The pressure toward the right side of the figure, which affects the cap 29, disappears, and the engaging member 30 returns to its original position with the force of the elastic member 27. Accordingly, a fixed part of the holder 7 engages with the tip of 30a of the engaging member again, thereby regulating the rotating direction of the holder for a certain degree. Then, the holder 7 is to wait for the next installing to the spindle 3.

Next, a modified example of the invention will be explained with reference to FIG. 3.

Figure 3:
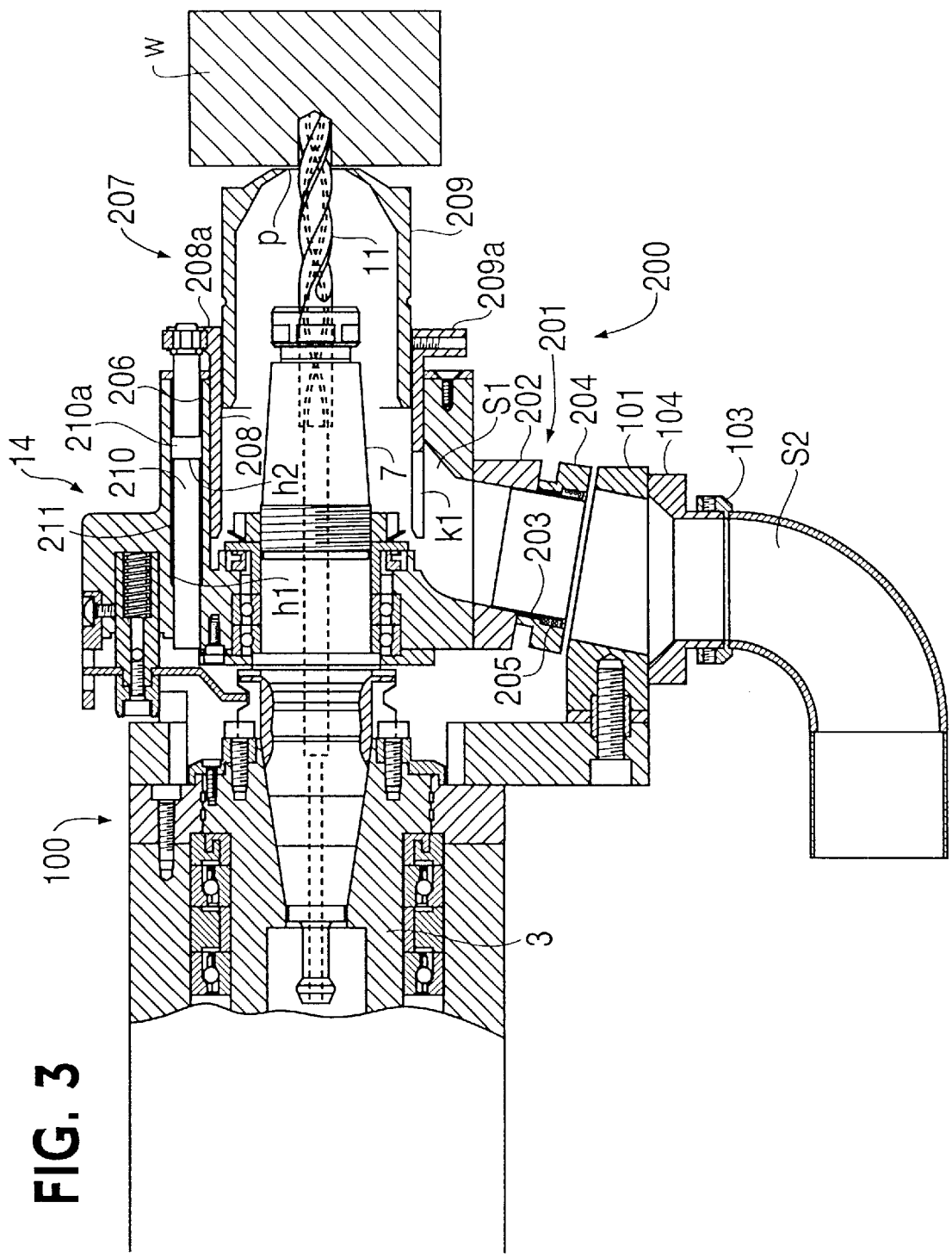
FIG. 3 is a sectional view of a processing head of a chip suction type machine tool according to a modified example of the above embodiment.
Figure 4:
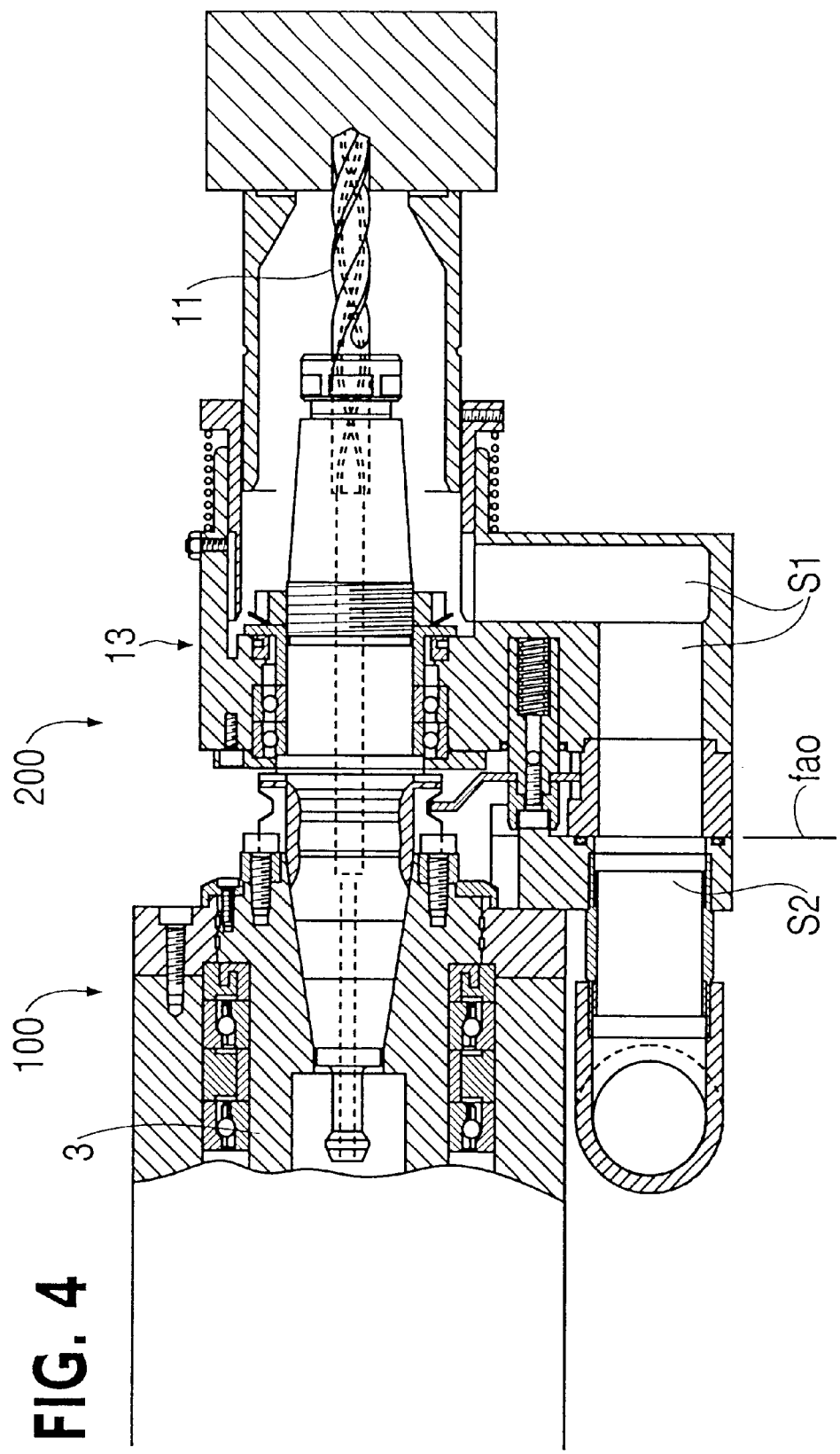
FIG. 4 is a sectional view of a conventional chip suction type machine tool.

FIG. 3 shows a processing head for a machine tool (a machining center) having an automatic tool exchanging structure, whose the tip of hood means is apart from the work.

Since many parts of FIG. 3 are the same as of the first example, only different points will be emphatically explained, and the same reference numbers are given to the same parts.

The thickness part of the hooding body 14 is provided with a guiding hole 206 along an axial direction of the holder 7. A cylinder 207 comprises a cylinder body 208 and an extension member 209. The cylinder body 208 is slidably inserted into the guiding hole 206. The extension member 209 is fixed on the tip of the cylinder body 208. The tip of the cylinder body 208 is provided with a protuberant rim 208a, and a guide bar 210 is fixed on a fixed position of the protuberant rim 28 along the axial direction of the holder 7. Here, the guide bar 210 is internally inserted into the guiding hole 206. Besides, a longitudinal part of the guide bar 210 is formed into an enlarged sliding part 210a that slides into the guiding hole 206. A compressed elastic member 211 is installed in the space between a stepped part h1 of the guiding hole 206 and a stepped part h2 of the sliding part 210a. The numeral k1 is a notch provided to the cylinder body 208. While the cylinder body 208 is sliding, an internal space of the notch k1 communicates with the vent s1.

The tip of the extension member 209 is formed into a U-letter shape from a cross section view toward the center of the cutting tool 11. At the center thereof is provided with an opening p whose diameter is somewhat larger than the cutting tool 11. In this case, the base end of the extension member 209 is inserted into the cylinder body 208, and tightened with a fixed screw 209a screwed to the protuberant rim 208a. Here, it is preferable that protruding dimensions of the extension member 209 are adjusted by operating the fixed screw 209a.

An explanation follows about a working example and its operation regarding thus constructed second embodiment. When the not-illustrated air suction device gives no negative pressure to tile air suction hole s2 during being at rest the cylinder 207 is pushed toward the tip of the cutting tool 11 through the guide bar 210 with an elasticity of the elastic member 211. Then, the tip of the cutting tool 11 is inserted into the inside of the cylinder 207.

When the air suction device is operated before starting an operation, the telescoping cylinder means 201 is extended as in the above embodiment, so that the air suction hole s2 is combined with the vent hole s1. The air inside the hooding body 14 is discharged through the telescoping cylinder means 201, while the air is sucked therein from the opening p. However. the inside of the hooding body 14 is made into a state of negative pressure by flow resistance of the air.

The negative pressure tends to pull tile cylinder 207 to the spindle 3 against the elasticity of the elastic member 211 in connection with atomospheric pressure around it. However, since the flow resistance is not large at this time, the cylinder 207 is not much displaced. Accordingly, the cutting tool 11 does not protrude from the opening p of the cylinder 207 yet.

Thereafter, when the tip of the cylinder 207 approaches the work w to process it, the opening p is covered with the surface thereof. Here, an inflow of the air from the opening p is limited and its flow resistance increases. Therefore, the negative pressure inside the hooding body 14 further increases, and the cylinder 207 is strongly pulled against the force of the elastic member 211. Accordingly, the cylinder 207 moves toward the spindle 3. However, when the dimension of its movement increases, the flow resistance of the air flowing from the opening p decreases, and the air flowing into tile hooding body 14 increases again. Regarding this, the negative pressure inside the hooding body 14 decreases, and the cylinder 207 returns to the tip side of the cutting tool 11 by the force of the elastic member 211. Therefore, the negative pressure inside the hooding body 14 increases again. By repetitions of these operations, the cylinder 207 is kept at a position apart from the work w for a fixed dimension, balancing with the force of the elastic member 211. The cylinder 207 is operated regardless of the cutting depth of the cutting tool 11 for the work w. Accordingly, the cylinder 207 is always apart from the work w for a fixed distance during processing, thereby preventing damage of the work w due to contact with the cylinder 207.

Besides, during processing the work w, the cutting tool 11 produces chips. The chips are continuously carried away into the hooding body 14 with a stream of the air which is sucked from the opening p through a space between the tip of the cylinder 207 and the work w. Then, the chips are gathered at a fixed place with the air through the vent hole s1, the telescoping cylinder means 201, and the air suction hole s2.

If the cutting tool 11 is an end mill, the cutting tool 11 moves along the surface of the work w while cutting it. In this case, too, the cylinder 207 is apart from the work w for a fixed distance. Therefore, the cylinder 207 does not damage the surface of the work w, nor is caught by steps of the surface.

Utility Value in the Industry

According to the above-described invention, when the tool attaching part is installed on or removed from the spindle head, any imbalance force is not generated due to close contact of the upstream end part of the air suction hole s2 and the downstream end part of the vent hole s1. Therefore, a smooth and exact treatment can be achieved.

Besides, even if chips adhere to a space between the air suction hole and the vent hole, they are removed with the air sucked into the air suction hole. Accordingly, the chips are not caught between the downstream end part of the vent hole and the upstream of the air suction hole.

Moreover, while the tool attaching part is installed on the spindle head, the present invention does not require an exactly constant dimension for a relative distance between the downstream end part of the vent hole and the upstream of the air suction hole. Accordingly, products can be made under a wide allowable error. Furthermore, it can diminish a lateral protrudent dimension of the tool attaching part.

According to the invention in claim 2, the above effects can be gained by the tool attaching part that widely surrounds the cutting tool by means of the cylinder. According to the invention in claim 3, the above effects can be gained by the tool attaching part in which the cylinder is free from contact with the work.

The invention according to claim 4 can achieve an exact operation and easy production at a low price.

According to the invention in claim 5, the hood means can be miniaturized and well balanced because it does not protrude toward a perpendicular direction to the spindle, thereby installing or removing the tool attaching part easily. Besides, when the tool attaching part is used sideways, it does not bend largely due to self weight, thereby effecting an exact processing.

According to the invention in claim 6, the tool attaching part can be further miniaturized. Besides, when the tool attaching part is installed on or removed from the spindle, the downstream end part of the vent hole is not caught in the upstream end part of the air suction hole owing to inclination of the contact face fa.

What is claimed is:

1. A chip suction type machine tool comprising:
   a tool attaching part 200 having a vent hole s1 for discharging chips and air through an inside of a hood means 13 that surrounds a cutting tool 11;
   a spindle head 100 having an air suction hole s2 that communicates with said air vent hole s1;
   said tool attaching part 200 installed in the spindle head 100;
   wherein a downstream end part of said vent hole s1 is closely faced to an upstream end part of said air suction hole s2 with the tool attaching part 200 installed in the spindle head 100;
   wherein a telescoping cylinder means 201 is provided between said downstream and upstream end parts, being extendable or retractable relative to at least one of the end parts;
   wherein said telescoping cylinder means 201 is retracted, by means of an elastic member 205 to separate the downstream end part from the upstream end part; and
   wherein the telescoping cylinder means 201 is extended by negative pressure when the negative pressure is given to the air suction hole s2 with the tool attaching part 200 installed on the spindle head 100, thereby closely connecting the downstream end part with the upstream end part.

2. A chip suction type machine tool as set forth in claim 1:
   wherein the hood means 13 comprises a hood body 14 surrounding the cutting tool 11 and a cylinder 19 having an opening for receiving the cutting tool on its front end face 19a;
   wherein said cylinder 19 is retractable in a direction of the cutting tool, and pushed forward in the direction of the cutting tool by means of an elastic member 18;
   wherein a front end face 19a of the cylinder 19 is in contact with a work, being closed while the cutting tool 11 is processing the work; and
   wherein chips produced by the cutting tool 11 are carried with air flowing into the cylinder 19, and discharged outside through the hood body 14, the vent hole s1, and the air suction hole s2.

3. A chip suction type machine tool as set forth in claim 1:
   wherein the hood means 13 comprises a hood body 14 surrounding the cutting tool 11 and a cylinder 207 whose front end face is in a U-letter shape from a cross section view, having a comparatively small opening p for receiving the cutting tool 11 at its center;
   wherein said cylinder 207 is retractable in a direction of the cutting tool, and pushed forward in the direction of the cutting tool by means of an elastic member 211;
   wherein a front end face of the cylinder 207 is close to but not in contact with a work by air flow caused by negative pressure of the air suction hole s2, while the cutting tool 11 is processing the work; and
   wherein chips produced by the cutting tool 11 is carried with air flowing into the cylinder 207, and discharged outside through the hood body 14, the vent hole s1, and the air suction hole s2.

4. A chip suction type machine tool as set forth in claim 1:
   wherein the telescoping cylinder means 201 comprises a retractable body with multiple cylinders and an elastic member 205 for retreating said body with multiple cylinders.

5. A chip suction type machine tool as set forth in claim 4:
   wherein the upstream end part of the air suction hole s2 of the spindle head 100 is close connected to the downstream end part of the vent hole s1 of the tool attaching part 200 beside the hood means 13.

6. A chip suction type machine tool as set forth in claim 4:
   wherein a contact surface of the upstream end part of the air suction hole s2 of the spindle head 100 and the downstream end part of the vent hole s1 of the tool attaching part 200 is inclined for a direction of the spindle; and
   wherein the contact surface is apart from a rotatory center of the spindle as it goes forward to the spindle 3.

7. A chip suction type machine tool as set forth in claim 5:
   wherein a contact surface of the upstream end part of the air suction hole s2 of the spindle head 100 and the downstream end part of the vent hole s1 of the tool attaching part 200 is inclined for a direction of the spindle; and
   wherein the contact surface is apart from a rotatory center of the spindle as it goes forward to the spindle 3.

* * * * *